(12) United States Patent
Hotta et al.

(10) Patent No.: US 11,390,312 B2
(45) Date of Patent: Jul. 19, 2022

(54) STEERING WHEEL

(71) Applicant: TOYODA GOSEI CO., LTD., Kiyosu (JP)

(72) Inventors: Masashi Hotta, Kiyosu (JP); Koji Kawamura, Kiyosu (JP); Wataru Miura, Kiyosu (JP); Norio Umemura, Kiyosu (JP); Masaaki Okuhara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/176,605

(22) Filed: Feb. 16, 2021

(65) Prior Publication Data
US 2021/0300454 A1    Sep. 30, 2021

(30) Foreign Application Priority Data

Mar. 26, 2020  (JP) .............................. JP2020-056566

(51) Int. Cl.
*B62D 1/06* (2006.01)
*B62D 1/04* (2006.01)

(52) U.S. Cl.
CPC ............... *B62D 1/046* (2013.01); *B62D 1/06* (2013.01); *B62D 1/065* (2013.01)

(58) Field of Classification Search
CPC .................................. B62D 1/06; B62D 1/065
See application file for complete search history.

(56) References Cited

U.S. PATENT DOCUMENTS

| 4,631,976 | A  | * | 12/1986 | Noda .................... | B62D 1/065 |
| | | | | | 219/204 |
| 6,512,202 | B2 | * | 1/2003 | Haag .................... | B62D 1/065 |
| | | | | | 219/204 |
| 2002/0033389 | A1 | * | 3/2002 | Sugiyama ............ | B62D 1/065 |
| | | | | | 219/204 |
| 2004/0144197 | A1 | * | 7/2004 | O'Grady ............... | H05B 3/565 |
| | | | | | 74/558 |

(Continued)

FOREIGN PATENT DOCUMENTS

JP    2017-188458 A    10/2017
JP    2019-137096 A     8/2019

*Primary Examiner* — Richard W Ridley
*Assistant Examiner* — Brian J McGovern
(74) *Attorney, Agent, or Firm* — Posz Law Group, PLC

(57) ABSTRACT

A steering wheel includes an annular rim portion, a boss section, one or more spokes interconnecting the rim portion and boss section, and a core member interconnecting these portions, the core member including a wheel portion disposed in the rim portion. The steering wheel further includes a cladding layer disposed around the wheel portion, a skin layer disposed on a front surface of the rim portion, and a sensor layer disposed between the cladding layer and the skin layer for detecting the driver's grip. The sensor layer includes a sheet-shaped substrate having stretch properties, a sensor composed of a conductive ink having stretch properties and applied to a front surface of the substrate, and an insulation sheet covering the sensor and having stretch properties. The sensor layer is generally formed into an annular band and mounted on an outer circumferential portion of the cladding layer by being stretched and expanded.

1 Claim, 9 Drawing Sheets

(56) References Cited

U.S. PATENT DOCUMENTS

| | | | |
|---|---|---|---|
| 2004/0155020 A1* | 8/2004 | Worrell | H05B 3/48 |
| | | | 219/204 |
| 2011/0073582 A1* | 3/2011 | Morita | B62D 1/065 |
| | | | 219/204 |
| 2015/0034622 A1* | 2/2015 | Sasaki | B62D 1/065 |
| | | | 219/204 |
| 2016/0009310 A1* | 1/2016 | Seki | B62D 1/065 |
| | | | 219/204 |
| 2016/0101805 A1* | 4/2016 | Nishio | H05B 6/02 |
| | | | 219/204 |
| 2017/0079089 A1* | 3/2017 | Okazaki | B62D 1/046 |
| 2017/0183025 A1* | 6/2017 | Okazaki | B62D 1/06 |
| 2017/0282955 A1* | 10/2017 | Morita | B29C 45/1671 |
| 2019/0002009 A1* | 1/2019 | Yamami | B62D 1/06 |
| 2019/0092367 A1* | 3/2019 | Mori | H05B 3/34 |
| 2019/0193771 A1* | 6/2019 | Yamami | B62D 1/06 |
| 2019/0241204 A1 | 8/2019 | Uematsu | |
| 2020/0239060 A1* | 7/2020 | Hyoudou | B62D 1/065 |
| 2020/0391616 A1* | 12/2020 | Wilson | G01D 5/2417 |
| 2021/0028784 A1* | 1/2021 | Takahara | B62D 1/046 |

* cited by examiner (A)

(B)

STEERING WHEEL

CROSS REFERENCE TO RELATED APPLICATIONS

The present application claims priority from Japanese Patent Application No. 2020-056566 of Hotta et al., filed on Mar. 26, 2020, the entire disclosure of which is incorporated herein by reference.

BACKGROUND

1. Technical Field

The present invention relates to a steering wheel that includes a sensor for detecting the driver's grip in the rim portion.

2. Description of Related Art

JP 2019-137096 A discloses a known steering wheel that includes a rim portion having a generally annular shape, a boss section disposed at the center of the rim portion, a plurality of spokes that interconnect the rim portion and boss section, and a core member that forms a skeleton of the rim portion, boss section and spokes. The steering wheel further includes a cladding layer that is disposed around a wheel portion of the core member disposed in the rim portion, a skin layer that is disposed on the front surface of the rim portion, and a sensor layer that is composed of conductive material and disposed between the cladding layer and skin layer for detecting whether the driver is gripping the rim portion. The sensor layer is composed of a synthetic resin sheet member having approximately 10 to 15% stretch properties, and a sensor composed of a wire that has a round sectional shape and is arranged in a serpentine configuration on the sheet member. The wire forming the sensor concurrently acts as a heating wire. The sheet member has a rectangular shape sized to the length of an inner circumferential portion of the rim portion. When the sensor layer is attached to the cladding layer as has been mounted around the wheel portion of the core member, a first edge in the width direction of the sheet member is firstly disposed in the inner circumferential portion of the rim portion, then the sheet member is attached to and wound around the rim portion toward the outer circumferential portion while being stretched so that a second edge in the width direction of the sheet member is brought close to the first edge. This way the sensor layer is mounted around the cladding layer in the rim portion while preventing wrinkles and slacks from forming.

In the above steering wheel, however, although the sheet member of the sensor layer has stretch properties, the wire forming the sensor impairs the stretch properties when attached to the sheet member because the sensor is composed of a wire which concurrently acts as a heating wire. This is likely to complicate the production process because it is presumed that a special attention would be required for the sensor layer to be arranged around the cladding layer without forming wrinkles and slacks. It would be desirable to provide a steering wheel including a grip sensor layer that has improved assembly easiness.

SUMMARY

An exemplary embodiment of the invention relates to a steering wheel including: an annular rim portion for gripping for steering; a boss section that is disposed at a center of the rim portion; one or more spokes that interconnect the rim portion and the boss section; a core member that interconnect the rim portion, the boss section and the spokes, the core member including a wheel portion that is disposed in the rim portion; a cladding layer that is disposed around the wheel portion of the core member; a skin layer that is disposed on a front surface of the rim portion; and a sensor layer for detecting whether a driver is gripping the rim portion, the sensor layer being disposed between the cladding layer and the skin layer. The sensor layer includes: a sheet-shaped substrate that is disposed toward the cladding layer and has stretch properties; a sensor for detecting whether the driver is gripping the rim portion, the sensor being composed of a conductive ink having stretch properties that is applied to a grip area by the driver on a front surface of the substrate; and an insulation sheet that covers the sensor and is disposed toward the skin layer, the insulation sheet having stretch properties. The sensor layer is generally formed into an annular band and mounted on an outer circumferential portion of the cladding layer in the rim portion by being stretched and expanded.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Especially, in the following detailed description, for purposes of explanation, numerous specific details are set forth in order to provide a thorough understanding of the disclosed embodiments. It will be apparent, however, that one or more embodiments may be practiced without these specific details.

Figure 1:
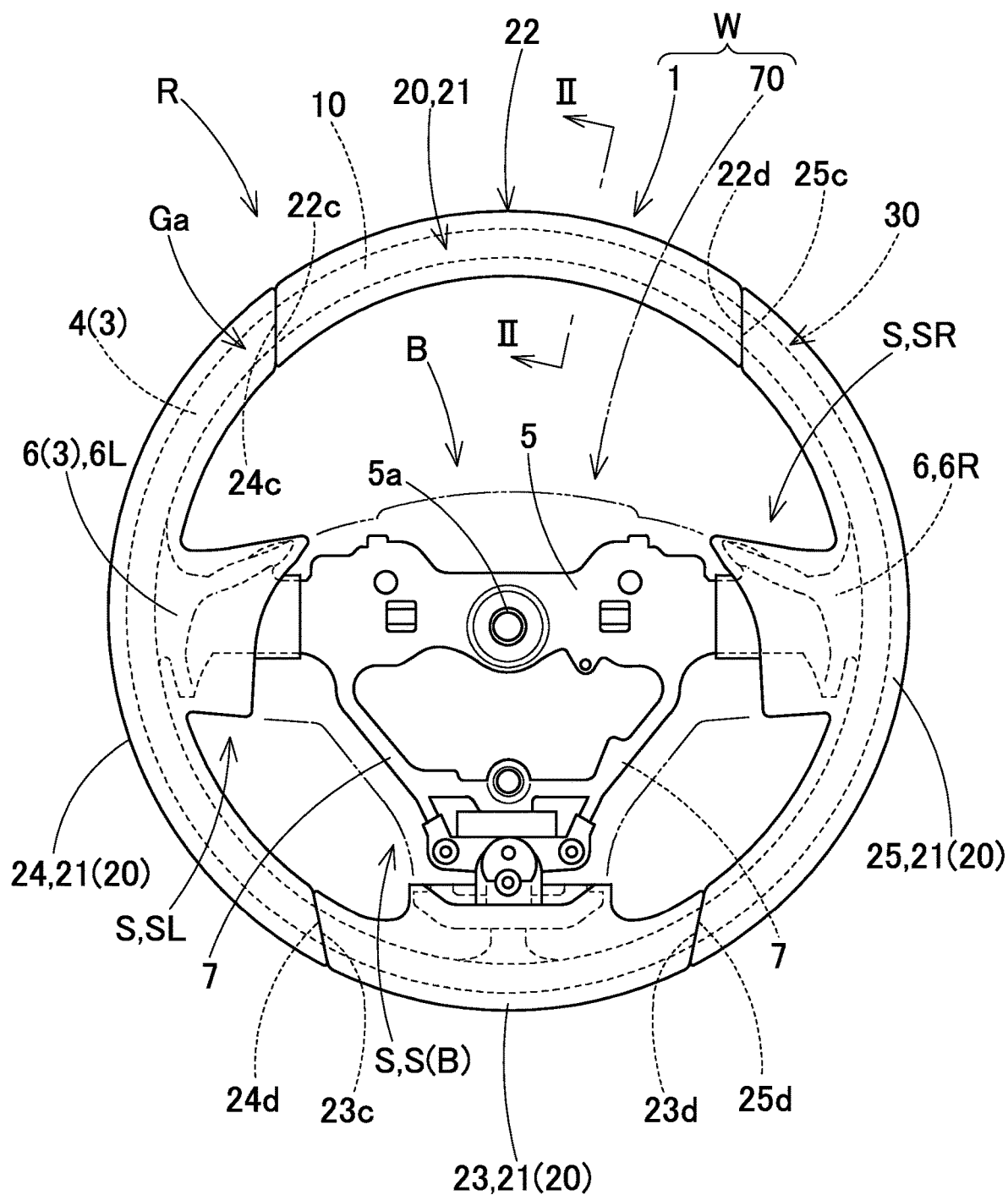
FIG. 1 is a schematic plan view of a steering wheel in accordance with an exemplary embodiment.

As shown in FIG. 1, a steering wheel W in accordance with an exemplary embodiment includes a rim portion R for gripping for steering, a boss section B that is disposed at the center of the rim portion R, and a plurality of spokes S (SL, SR, SB) that interconnect the boss section B and the rim portion R. The rim portion R has a generally annular shape.

The spokes S includes spokes SL, SR that extend respectively toward the left and right from the boss section B, and a spoke SB that extends rearward from the boss section B. The steering wheel W includes an airbag device 70 that is mounted on top of the boss section B and depicted with dashed-and-double-dotted lines in FIG. 1, a steering-wheel body 1, and a lower cover 7 (not shown) covering an underside of the boss section B.

The steering-wheel body 1 includes a core member 3 that interconnects the rim portion R, boss section B and spokes S. The core member 3 is made from such metal as aluminum alloy. The core member 3 includes a wheel portion 4 disposed in the rim portion R, a boss portion 5 disposed in the boss section B, and spoke portions 6 (6L, 6R) and 7 that are respectively disposed in the spokes SL, SR, SB and interconnect the wheel portion 4 and boss portion 5. The boss portion 5 of the core member 3 includes a boss 5a of steel to be connected to the steering shaft of a vehicle. The spoke portions 6 includes left and right spoke portions 6L, 6R disposed in the left and right spokes SL, SR, and two spoke portions 7 that are disposed in the rear spoke SB. The spoke portions 7 are integral in a side toward the wheel portion 4 and bifurcate towards the left and right at a vicinity of the boss portion 5.

Figure 2:
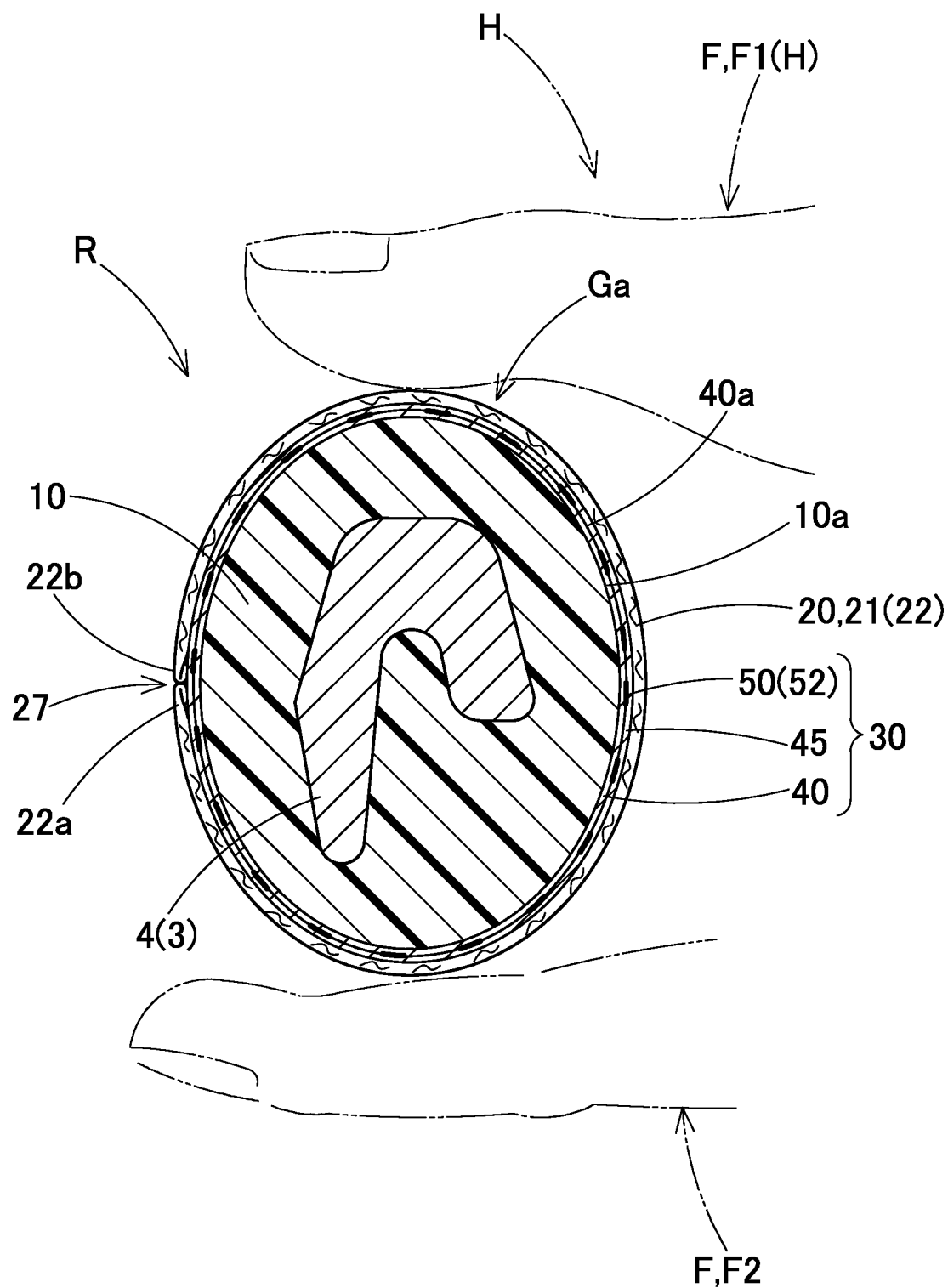
FIG. 2 is a sectional view of a rim portion of the steering wheel taken along line II-II of FIG. 1.

As shown in FIG. 2, in the rim portion R, a cladding layer 10 is disposed around the wheel portion 4 of the core member 3, and a skin layer 20, which is composed of leather 21, is disposed on the front surface of the rim portion R. Further, there is disposed, between the cladding layer 10 and skin layer 20, a sensor layer 30 for detecting whether the driver is gripping the rim portion R. The sensor layer 30 is disposed in a grip area Ga, which is to be gripped by the driver, in the rim portion R. The sensor layer 30 includes a sensor 50 composed of conductive material, as will be described later.

Figure 3:
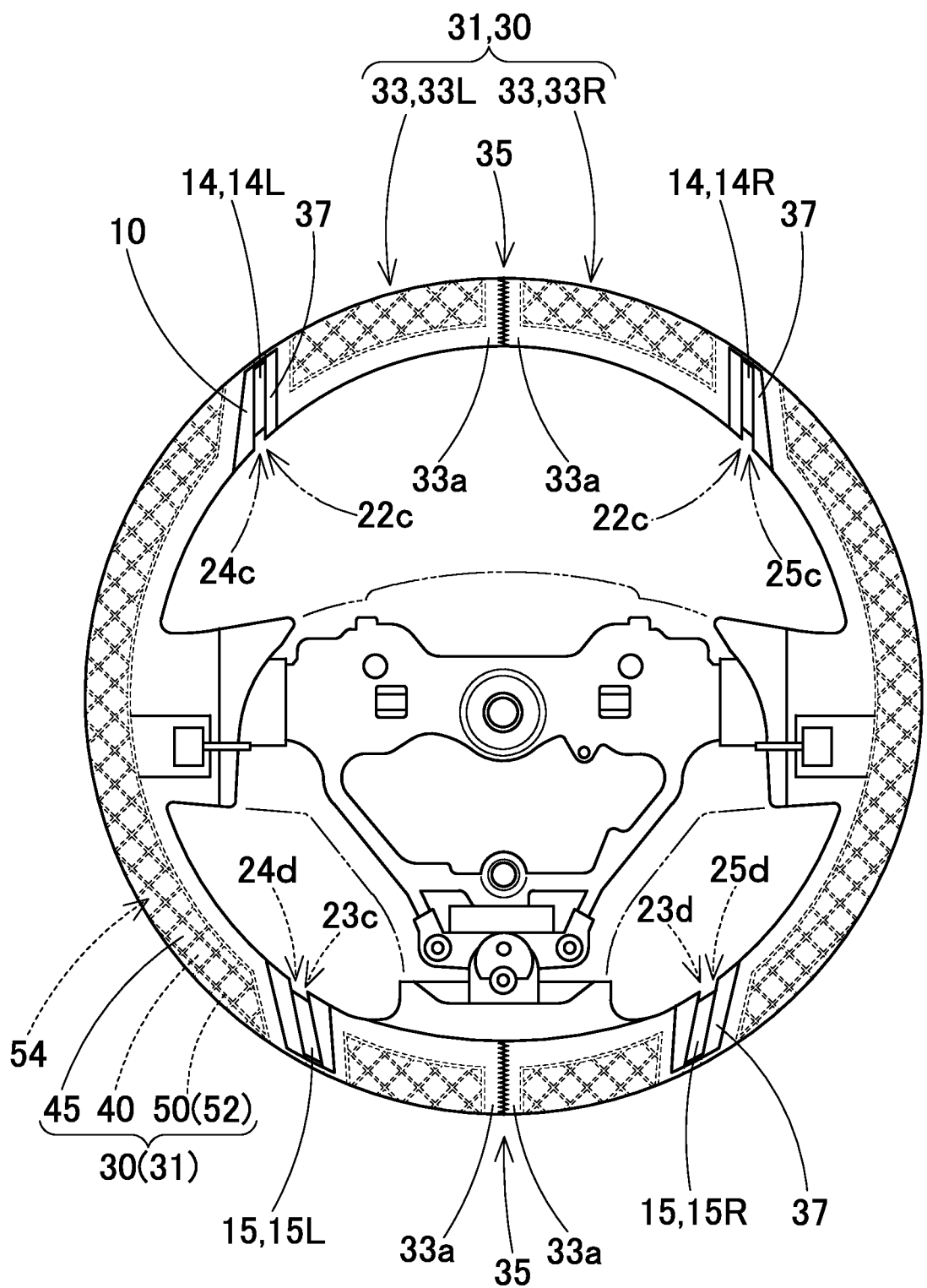
FIG. 3 is a plan view of the steering wheel in accordance with the exemplary embodiment with a skin layer eliminated, showing a sensor layer arranged on a front surface of a cladding layer in the rim portion.
Figure 8:
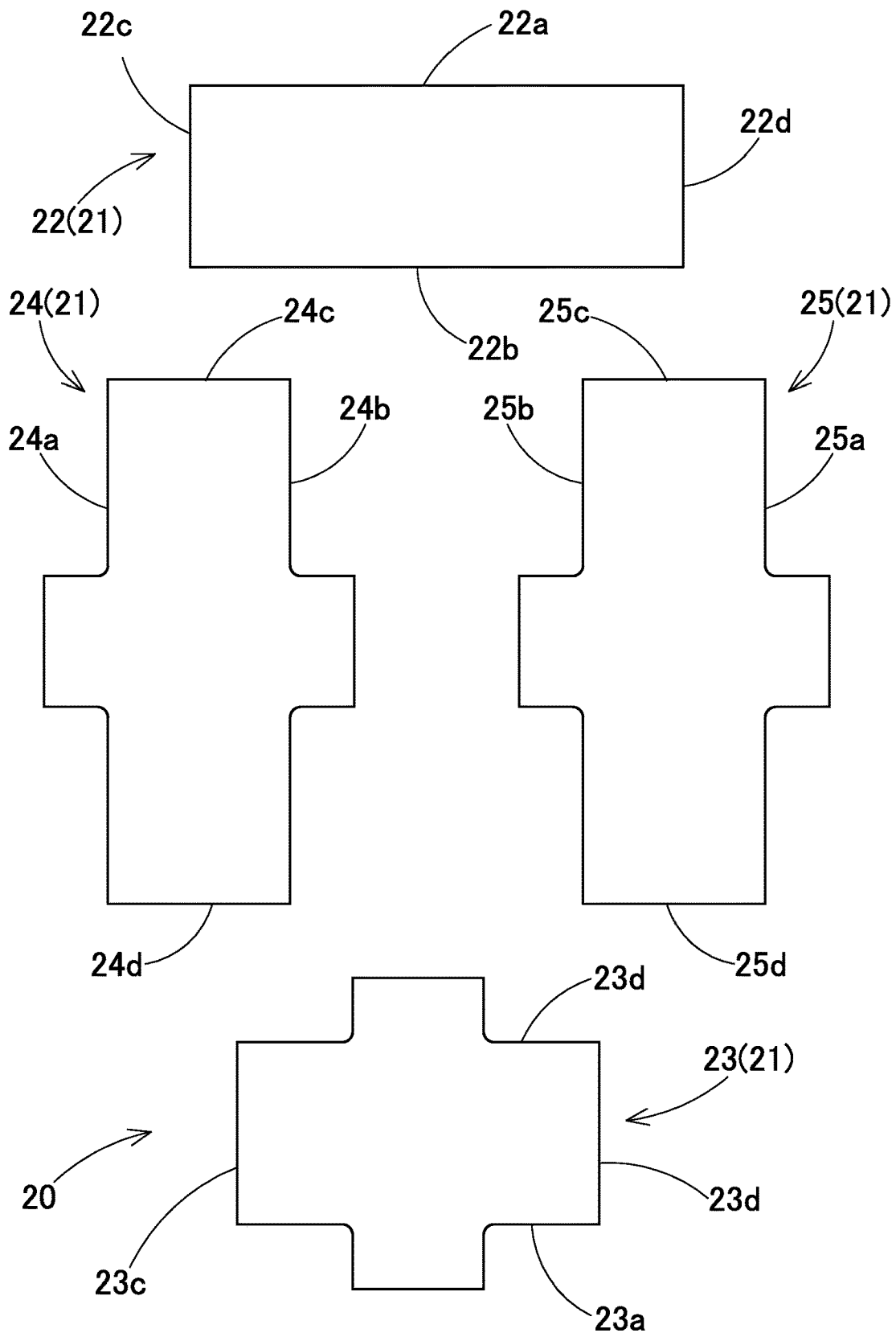
FIG. 8 is a development view of leather members for forming the skin layer of the steering wheel in accordance with the exemplary embodiment.

The cladding layer 10 is disposed around the wheel portion 4 of the core member 3 and around portions of the spoke portions 6 (6L, 6R) and 7 adjoining the wheel portion 4. The cladding layer 10 is fabricated from synthetic resin material such as urethane, and formed around the wheel portion 4 and spoke portions 6, 7 of the core member 3 by injection molding or the like. As shown in FIG. 3, the cladding layer 10 includes, in a leftward portion and in a rightward portion of each of front and rear portions, an annular gutter 14 (14L, 14R), 15 (15L, 15R) extending along a circumference of section of the wheel portion 4. As shown in FIG. 8, terminal edges 22c, 22d, 23c, 23d, 24c, 24d, 25c, 25d of leather members 22, 23, 24, 25 for forming the skin layer 20 are respectively tucked into the gutters 14L, 14R, 15L, 15R.

The skin layer 20 of this embodiment is composed of leather 21. As shown in FIGS. 1 and 8, the leather 21 is composed of four leather members 22, 23, 24, 25. The leather member 22 is disposed in the front portion of the rim portion R, the leather member 23 is disposed in the rear portion of the rim portion R, the leather member 24 is disposed in a left portion of the rim portion R, and the leather member 25 is disposed in a right portion of the rim portion R. The leather member 22 is disposed in the front portion of the rim portion R with the opposite side edges 22a, 22b in width direction sewn together, with the terminal 22c tucked into the gutter 14L, and with the terminal 22d tucked into the gutter 14R. The leather member 23 is disposed in the rear portion of the rim portion R with the opposite side edges 23a, 23b in width direction sewn together, with the terminal 23c tucked into the gutter 15L, and with the terminal 23d tucked into the gutter 15R. The leather member 24 is disposed in the left portion of the rim portion R to an adjoining region in the spoke SL with the opposite side edges 24a, 24b in width direction sewn together, with the terminal 24c tucked into the gutter 14L, and with the terminal 24d tucked into the gutter 15L. The leather member 25 is disposed in the right portion of the rim portion R to an adjoining region in the spoke SR with the opposite side edges 25a, 25b in width direction sewn together, with the terminal 25c tucked into the gutter 14R, and with the terminal 25d tucked into the gutter 15R.

Figure 4:
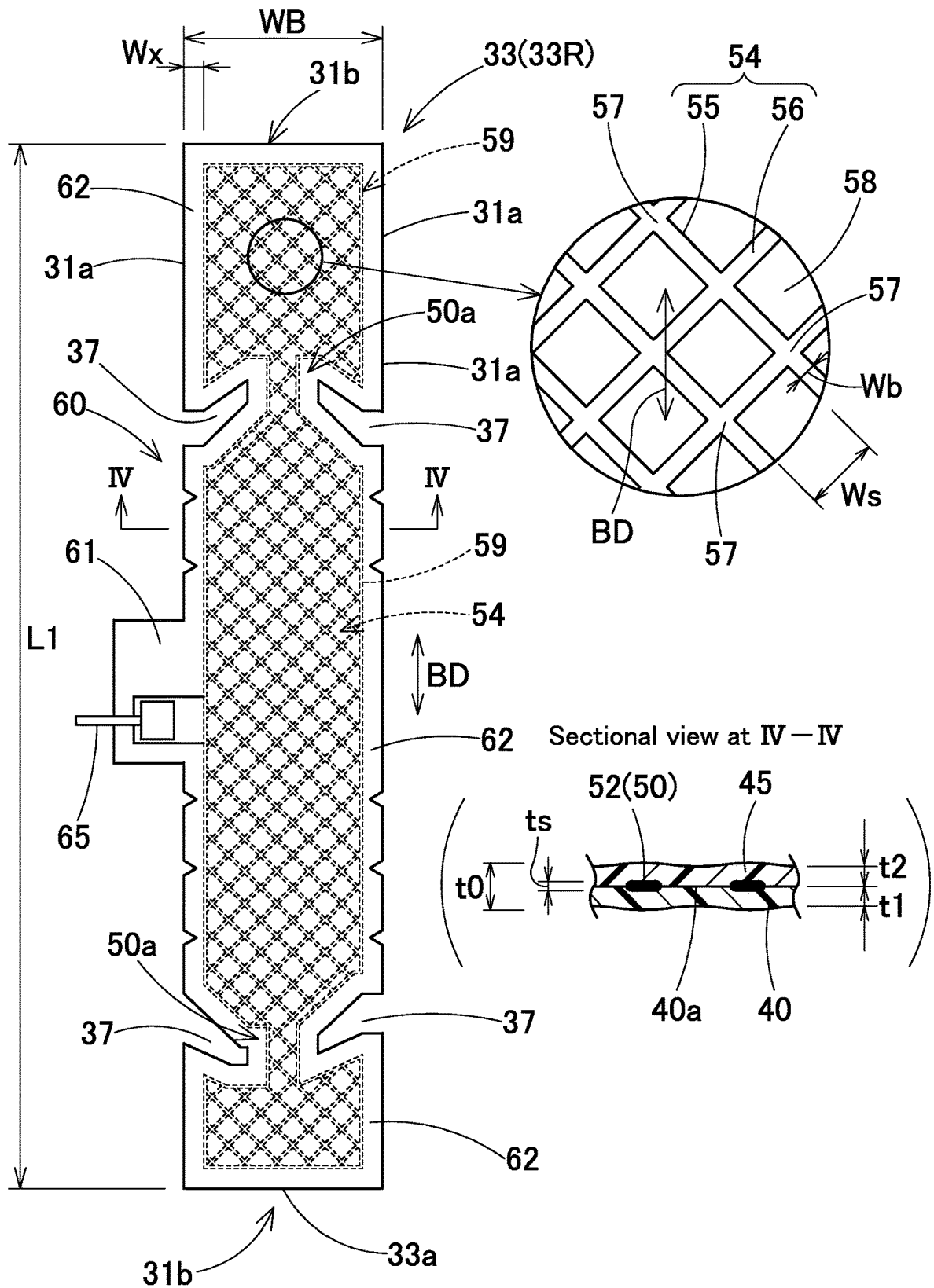
FIG. 4 is a plan view of a band-shaped member for forming the sensor layer.
Figure 5:
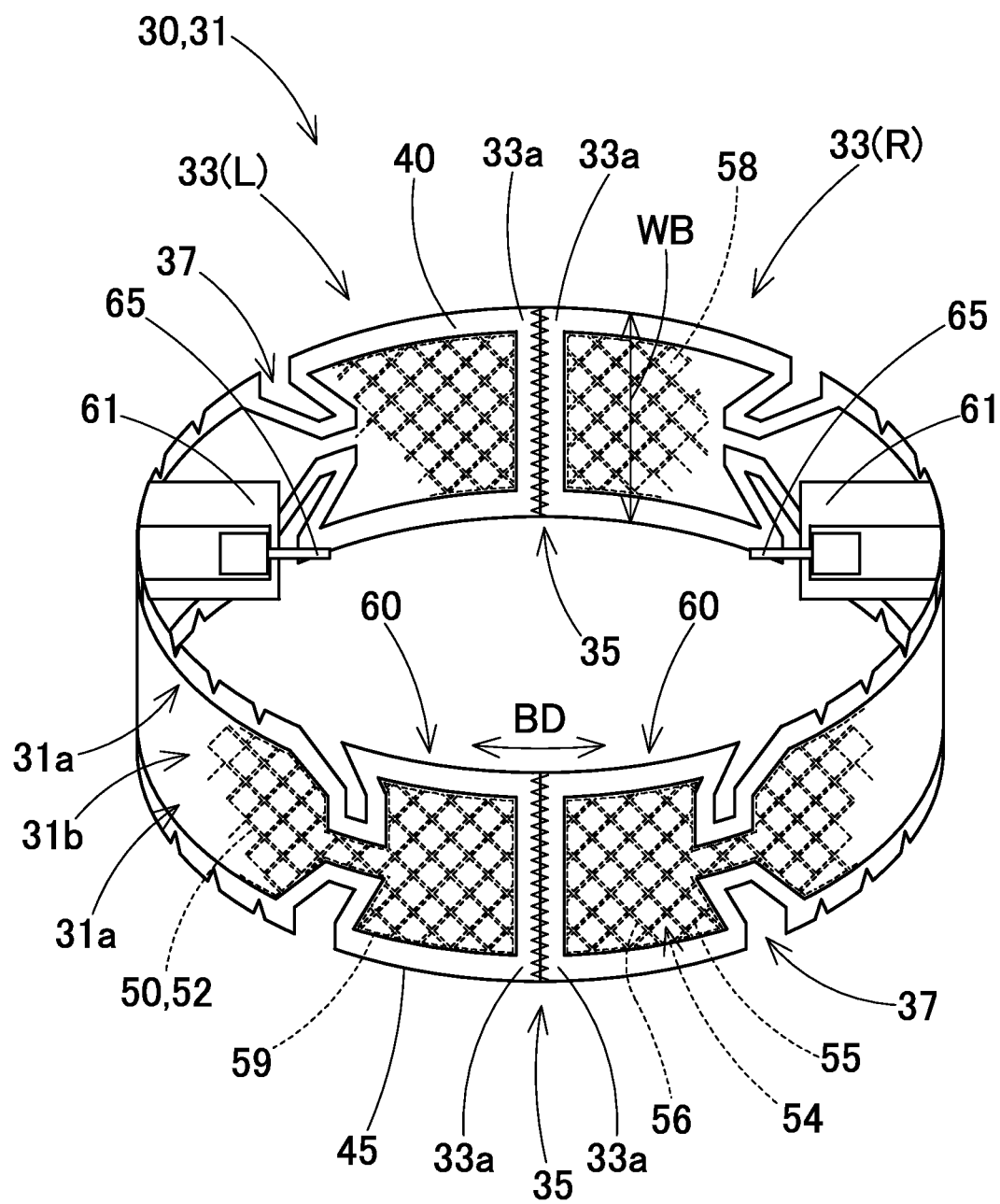
FIG. 5 is a schematic perspective view of the sensor layer as formed into an annular shape.
Figure 6:
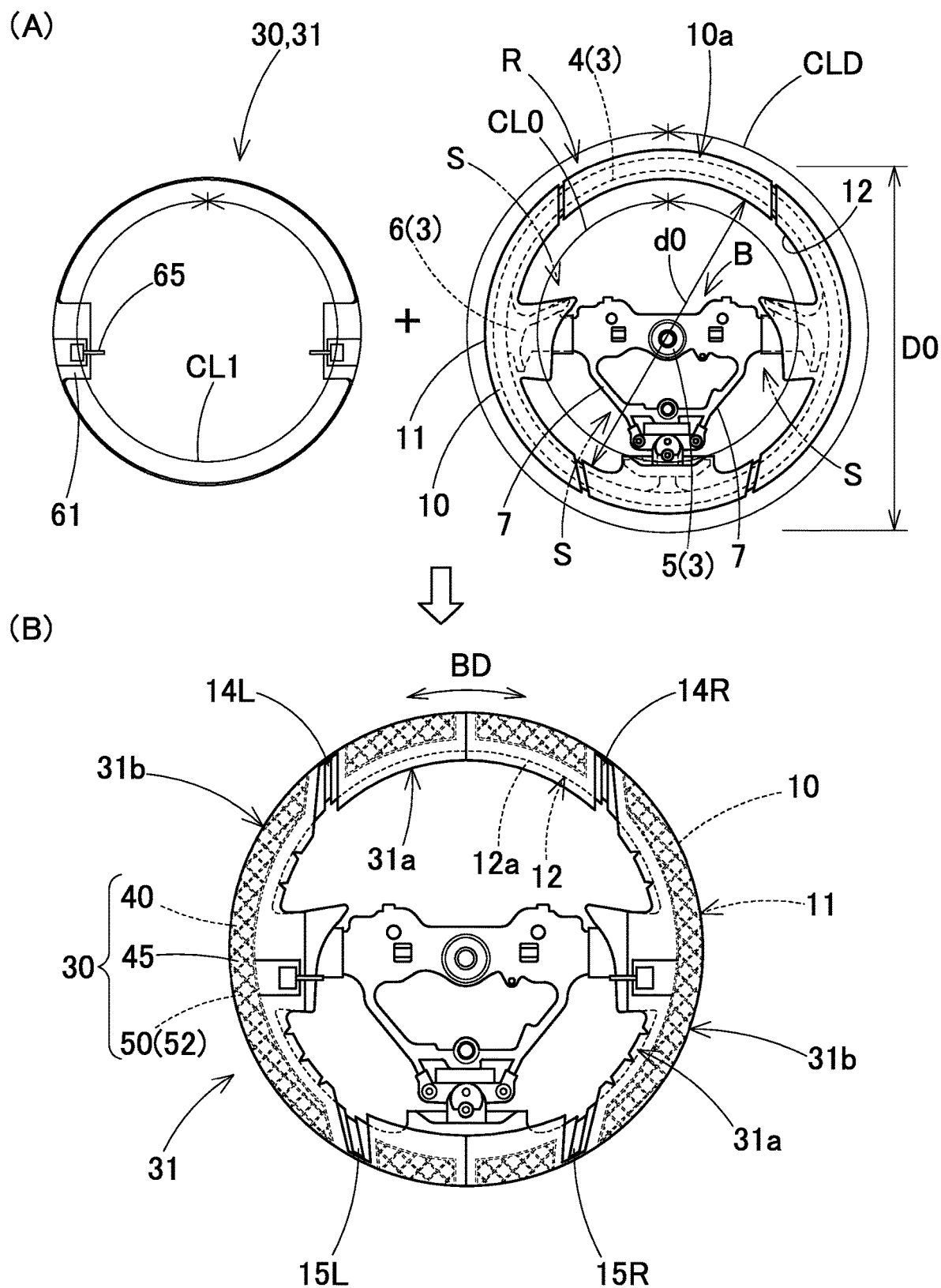
FIG. 6 illustrates assembling of the sensor layer on the front surface of the cladding layer.

Referring to FIGS. 2 to 4, the sensor layer 30 includes a sheet-shaped substrate 40 that is disposed toward the cladding layer 10 and has stretch properties, a sensor 50 that is disposed in the grip area Ga of the rim portion R on a front surface 40a of the substrate 40, and an insulation sheet 45 that covers the sensor 50 and is disposed toward the skin layer 20. As shown in FIGS. 5 and 6, the sensor layer 30 of this embodiment is prepared as an assembly 31 that is formed into a generally annular band which is shaped along a circumferential direction of the rim portion R (more particularly, of the cladding layer 10 as mounted around the wheel portion 4 of the core member 3), by coupling ends 33a of a pair of bilaterally symmetrical split band-shaped members 33 (33L, 33R) together.

The sensor layer 30 includes a plurality of cut-out portions 37 formed corresponding to the gutters 14, 15 of the cladding layer 10, to allow the terminals 22c, 22d, 23c, 23d, 24c, 24d, 25c, 25d of the leather members 22, 23, 24, 25 to be tucked into the gutters 14, 15. Each of the cut-out portions 37 is not formed to correspond to an entirely of the gutter 14 or 15. Since the sensor 50 includes two narrow-width portions 50a (FIG. 4) for allowing the sensor 50 to be arranged continuously, each of the cut-out portions 37 extends only to a vicinity of the narrow-width portion 50a.

The substrate 40 of the sensor layer 30 is fabricated of polyurethane or the like having stretch properties and formed into a sheet. The insulation sheet 45 is composed of a sheet material of polyurethane or the like having stretch properties. In this embodiment, the substrate 40 and insulation sheet 45 is of the same material. A thickness t1 of the substrate 40 is approximately 100 μm (0.1 mm). Accordingly, a thickness t2 of the insulation sheet 45 is approximately 100 μm (0.1 mm).

The substrate 40 and insulation sheet 45 would be difficult to mount on the rim portion R if they were not sufficiently stretchy or too stretchy. More specifically, if the substrate 40 and insulation sheet 45 were not sufficiently stretchy, it would be difficult to arrange them on an outer circumferential portion 11 (FIG. 6) of the cladding layer 10. If they were too stretchy, edges 31a of the assembly 31 might lap over one another overly in an inner circumferential edge 12 portion of the cladding layer 10. Accordingly, the substrate 40 and insulation sheet 45 in one or more embodiments may have a stretch rate in a range from 10 to 100%. In one or more embodiments, the substrate 40 and insulation sheet 45 have a stretch rate in a range from 50 to 80%. The substrate 40 and insulation sheet 45 should also have no fear of tear.

The sensor 50 is composed of conductive ink 52 that is applied to a region in the front surface 40a of the substrate 40 corresponding to the grip area Ga of the rim portion R. The conductive ink 52, as applied to the substrate 40, has stretch properties equal to or more than that of the substrate 40 and insulation sheet 45. The conductive ink 52 contains silicone resin, conductive filler such as silver powder, and solvent or the like, by way of example (the content of the conductive filler is approximately 60 to 70 mass percent).

The conductive ink 52 forming the sensor 50 is applied to the front surface 40a of the substrate 40 by screen printing or the like. In this specific embodiment, the conductive ink 52 is arranged in a lattice pattern 54 in which a first set of straight band-shaped lines 55 and a second set of straight band-shaped lines 56 intersect one another generally perpendicularly, as shown in FIG. 4. The lattice pattern 54 includes, in the circumference, a frame 59 in which terminals of the band-shaped lines 55 and those of the band-shaped lines 56 intersect one another. In this embodiment, moreover, the lattice pattern 54 is formed such that its bias direction BD extends along a circumferential direction of the sensor layer 30 formed into a ring, as shown in FIGS. 4 and 5.

A thickness ts (FIG. 4) of the conductive ink 52 is approximately 10 μm. Since the lattice pattern 54 is formed by printing, a thickness of the conductive ink 52 in intersections 57 and intersections 59 (in the frame 59) of the band-shaped lines 55 and 56 is not thicker than and equal to the thickness ts.

In this embodiment, moreover, a width Wb of each of the band-shaped lines 55, 56 and frame 59 is approximately 0.5 mm. A margin 62 in an outer edge 31a of the sensor layer 30 where the conductive ink 52 is not applied has a width Wx of approximately 10 mm.

Further, a dimension Ws of a gap between the band-shaped lines 55 and between band-shaped lines 56 is 3 mm that is in a range from 1 to 9 mm.

To explain an occupancy of the conductive ink 52 in the front surface 40a of the substrate 40 with respect to the width Wb of each of the band-shaped lines 55, 56 and gap dimension Ws in the lattice pattern 54, a 100% occupancy will nullify the significance of forming the lattice pattern 54, while a too little occupancy means that the width Wb is small and likely to have a lot of interruptions. Accordingly, the occupancy of the conductive ink 52 in the front surface 40a of the substrate 40 is 20 to 80% in one or more embodiments. In one or more embodiments, the occupancy is 20 to 50%. In this specific embodiment, the occupancy of the conductive ink 52 in the front surface 40a of the substrate 40 is approximately 30%.

The sensor layer 30 of this embodiment includes the substrate 40, the sensor 50 that is composed of the conductive ink 52 applied to the front surface 40a of the substrate 40, and the insulation sheet 45 that is adhered to the front surface 40a of the substrate 40 with not-shown double-faced tapes or the like by the back surface 45b in order to cover the sensor 50. That is, the substrate 40 and insulation sheet 45 sandwich the sensor 50.

A thickness t0 of the sensor layer 30 of this embodiment in which the substrate 40 and insulation sheet 45 are adhered together while sandwiching the sensor 50 is approximately 230 μm (i.e. 0.23 mm).

In this embodiment, moreover, the sensor 30 is mounted on a front surface 10a of the cladding layer 10 in the form of the generally band-shaped annular assembly 31 that is formed by coupling ends 33a of a pair of the band-shaped members 33 (33L, 33R) together by sewing or adhesive seams 35.

Each of the band-shaped members 33 (33L, 33R) includes, in the substrate 40 and insulation sheet 45 as coupled together, a protruding portion 61 that protrudes toward the spoke SL/SB. A connecting wire 65, which is to be connected to a not-shown detection circuit for detecting the driver's grip by detecting an electrostatic capacitance, is disposed in an area of the protruding portion 61 extending from the frame 59 of the conductive ink 52. Since the sensor layer 30 of this embodiment is composed of the band-shaped members 33 (L, R) each of which has one sensor 50, one each connecting wire 65 is disposed in each of the band-shaped members 33 (L, R).

In this exemplary embodiment, as shown in FIG. 5, the assembly 31 constituting the sensor layer 30 is formed by coupling the ends 33a of the split pair of band-shaped members 33 (33L, 33R) together. Thus, the assembly 31 has a cylindrical shape except the protruding portions 61. A portion of the assembly 31 (i.e. the sensor layer 30) except the protruding portions 61 will hereinafter be called a general portion 60.

In this embodiment, a length in the circumferential direction of the assembly 31 (a length that is twice a length L1 (FIG. 4) of each of the band-shaped members 33 of the sensor layer 30), namely, a circumferential length CL1 (FIG. 6) of the assembly 31 is equal to a length of the inner circumferential edge 12 of the cladding layer 10 in the rim portion R of the steering wheel W, i.e. equal to a circumferential length CL0 of the inner circumferential edge 12 of the cladding layer 10 in the rim portion R of the steering wheel W.

Here in this embodiment, the cladding layer 10 as mounted on the core member 3 of the steering-wheel body 1 has an outer diameter DO (FIG. 6) of approximately φ370, an outer circumferential length CLD of approximately 1160 mm, an inner diameter d0 of approximately φ290, and the inner circumferential length CL0 of approximately φ20 mm. Therefore, the circumferential length CL1 of the sensor layer 30 as formed into the assembly 31 is approximately φ20 mm, which is generally equal to the inner circumferential length CL0 of the cladding layer 10.

When the assembly 31 (i.e. the sensor layer 30) is arranged on the cladding layer 10 as has been mounted on the wheel portion 4 of the core member 3, it is wound around the cladding layer 10 in a circumferential direction of a section of the cladding layer 10 so that the edges 31a in width direction of the assembly 31 are brought close to each other. Since the skin layer 20 is further mounted on the front surface 30a of the sensor layer 30, as shown in (B) of FIG. 7, the edges 31a of the assembly 31 may slightly overlap except the applied area of the conductive ink 52 or may be slightly distant from each other when arranged on the cladding layer 10. Accordingly, a width WB (FIGS. 4, 5) of the general portion 60 of the assembly 31 (i.e. the sensor layer 30) except the protruding portions 61 is generally equal to a circumferential length RL (FIG. 7) of the section of the cladding layer 10 as mounted on the wheel portion 4. The "generally equal" range here connotes a range from approximately 60 to 110% of the circumferential length RL. In the illustrated embodiment, the width WB of the assembly 31 (i.e. the sensor layer 30) is approximately φ0 mm, and the circumferential length RL of the section of the cladding layer 10 is approximately 100 m.

Assembling of the steering wheel W is now described. Firstly, the cladding layer 10 is formed on the wheel portion 4 and portions of the spoke portions 6 and 7 adjoining the wheel portion 4 in the core member 3 of the steering-wheel body 1. Then the sensor layer 30 is mounted on the front surface 10a of the cladding layer 10. As shown in FIG. 6, mounting of the sensor layer 30 is easily conducted by putting the annular sensor layer 30 on the outer circumferential portion 11 of the cladding layer 10 while stretching and expanding the sensor layer 30.

Figure 7:
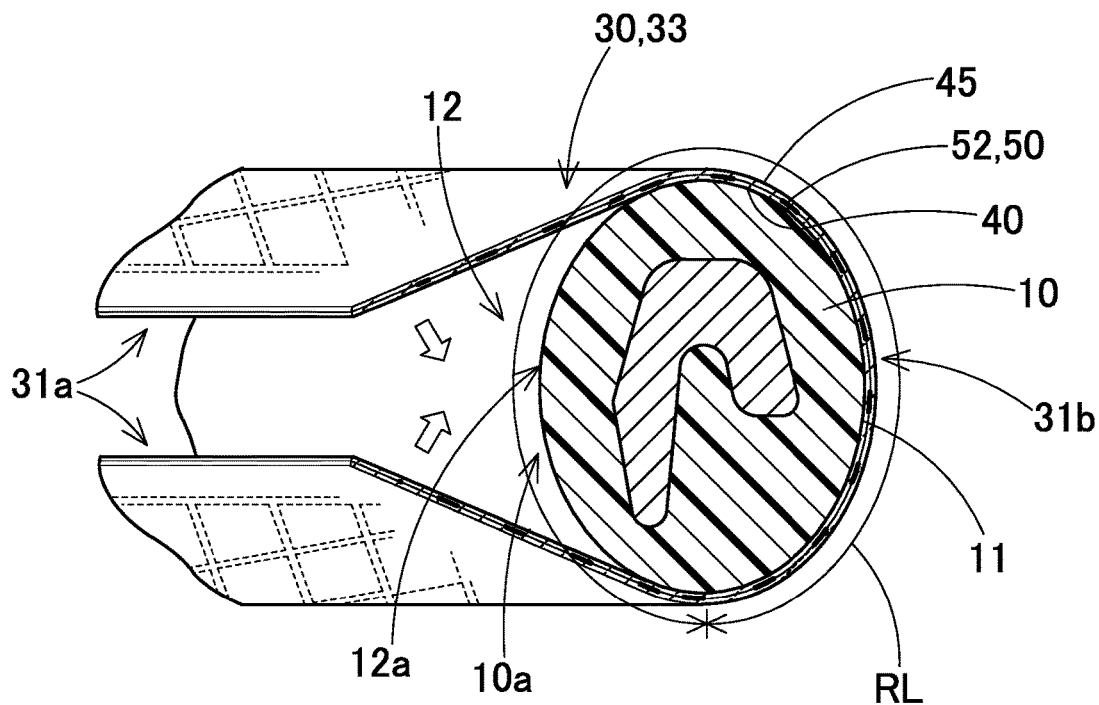
FIG. 7 illustrates the way both edges in width direction of the sensor layer are disposed in an inner circumferential portion of the cladding layer.
Figure 7:
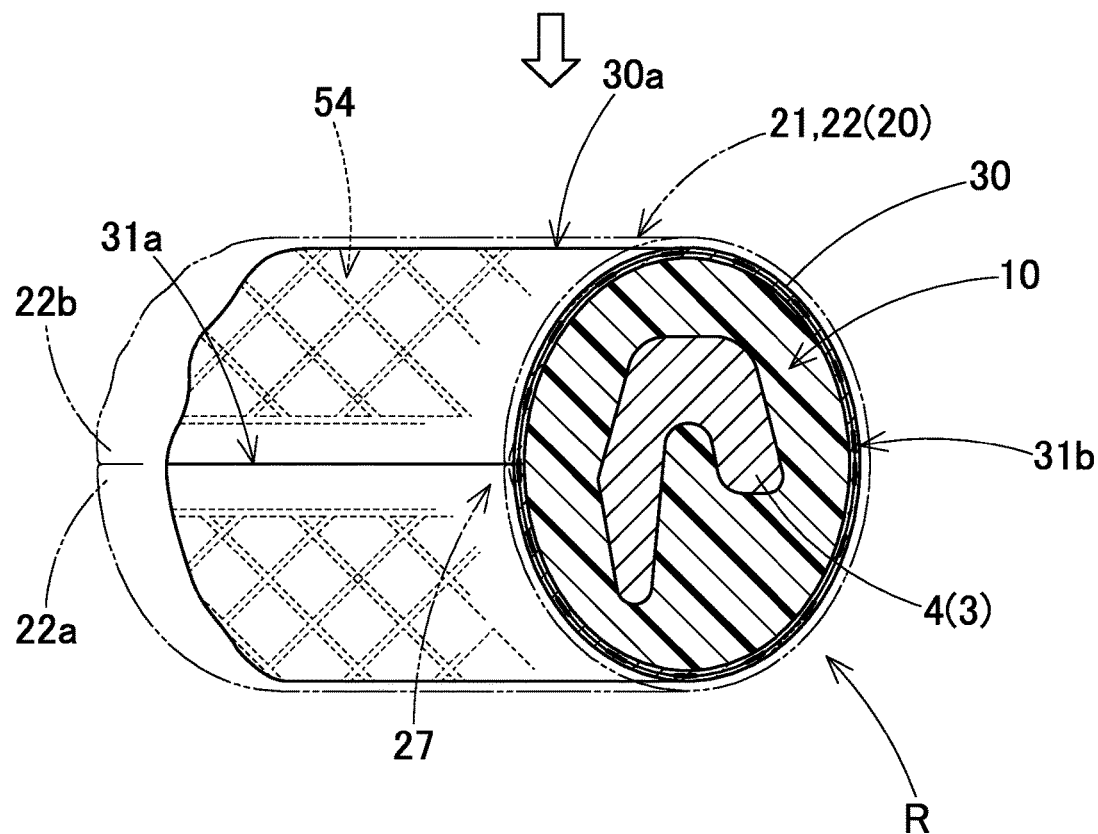

Thereafter, as can be seen in FIG. 7, the leather 21 for forming the skin layer 20 is used to press both of the edges 31a of the sensor layer 30 toward the inner circumferential edge 12 of the cladding layer 10 in the rim portion R and to bring the sensor layer 30 into close contact with the front surface 10a of the cladding layer 10. The sensor layer 30 may be adhered to the front surface 10a of the cladding layer 10 with adhesive.

To describe mounting of the leather 21 more specifically, the leather member 22 is placed on the front surface 30a of the sensor layer 30 between the gutters 14L and 14R in the cladding layer 10 so that a vicinity of the center in the width direction is positioned in a vicinity of the outer circumferential portion 11 of the cladding layer 10, then the leather member 22 is wound around the sensor layer 30 so that the side edges 22a and 22b are brought close to the inner circumferential edge 12 of the cladding layer 10, then the side edges 22a and 22b are sewn together as shown in (B) of FIG. 7. Then the terminal 22c of the leather member 22 is tucked into the gutter 14L while the terminal 22d is tucked into the gutter 14R. Thus, the leather member 22 is mounted on the front portion of the rim portion R. The leather member 23 is placed on the front surface 30a of the sensor layer 30 between the gutters 15L and 15R in the cladding layer 10 so that a vicinity of the center in the width direction is positioned in a vicinity of the outer circumferential portion 11 of the cladding layer 10, then the leather member 23 is wound around the sensor layer 30 so that the side edges 23a and 23b are brought close to the inner circumferential edge 12 of the cladding layer 10, then the side edges 23a and 23b are sewn together. Then the terminal 23c of the leather member 23 is tucked into the gutter 15L while the terminal 23d is tucked into the gutter 15R. Thus, the leather member 23 is mounted on the rear portion of the rim portion R. The leather member 24 is placed on the front surface 30a of the sensor layer 30 between the gutters 14L and 15L in the cladding layer 10 so that a vicinity of the center in the width direction is positioned in a vicinity of the outer circumferential portion 11 of the cladding layer 10, then the leather member 24 is wound around the sensor layer 30 so that the side edges 24a and 24b are brought close to the inner circumferential edge 12 of the cladding layer 10, then the side edges 24a and 24b are sewn together. Then the terminal 24c of the leather member 24 is tucked into the gutter 14L while the terminal 24d is tucked into the gutter 15L. Thus, the leather member 24 is mounted on the left portion of the rim portion R. The leather member 25 is placed on the front surface 30a of the sensor layer 30 between the gutters 14R and 15R in the cladding layer 10 so that a vicinity of the center in the width direction is positioned in a vicinity of the outer circumferential portion 11 of the cladding layer 10, then the leather member 25 is wound around the sensor layer 30 so that the side edges 25a and 25b are brought close to the inner circumferential edge 12 of the cladding layer 10, then the side edges 25a and 25b are sewn together. Then the terminal 25c of the leather member 25 is tucked into the gutter 14R while the terminal 25d is tucked into the gutter 15R. Thus, the leather member 25 is mounted on the right portion of the rim portion R. Thus, the skin layer 20 is mounted on the front surface 30a of the sensor layer 30 as well as the sensor layer 30 is positioned against and brought into close contact with the cladding layer 10. The sensor layer 30 may be provided with an adhesive on the front surface 30a so that the leather members 22, 23, 24 and 25 are wound there around.

Thereafter, a not-shown lower cover is mounted on the lower portion of the boss section B of the steering-wheel body 1 of the steering wheel W as provided with the skin layer 20. The boss 5a of the boss section B is then fastened to the steering shaft of the vehicle, and the airbag device 70 is mounted on the boss section B. Thus, the steering wheel W is completed and mounted on the vehicle. When the airbag device 70 is mounted on the steering wheel W, the connecting wires 65 of the sensors 50 are connected to the lead wires extending from the not-shown detection circuit for detecting the driver's grip.

When fingers F (F1, F2, see FIG. 2) of a hand H of the driver come close to the sensor layer 30 in the rim portion R of the steering wheel W for holding the rim portion R, the detection circuit detects elevation of electrostatic capacitance, thus detects the driver's grip.

With the steering wheel W in accordance with the exemplary embodiment, when the annular sensor layer 30 is mounted on the front surface 10a of the cladding layer 10 in the rim portion R, the mounting is easily conducted by putting the sensor layer 30 on the outer circumferential portion 11 of the cladding layer 10 while stretching and expanding the sensor layer 30, as can be seen in FIG. 6. If then the sensor layer 30 is adhered toward the inner circumferential edge 12 of the cladding layer 10, or pressed onto the cladding layer 10 with the use of the skin layer 20, the sensor layer 30 is quickly disposed over the front surface 10a of the cladding layer 10 (over an entirety of the circumference of the section of the cladding layer 10) including the inner circumferential edge 12 of the cladding layer 10, as can be seen in FIG. 7. Since the sensor layer 30 is composed of the substrate 40, the sensor 50 composed of the conductive ink 52 and the insulation sheet 45 all of which have stretch properties, if the circumferential length CL1 of the sensor layer 30 is so configured as not to cause wrinkles and slacks, the sensor layer 30 is easily mounted on the front surface 10a of the cladding layer 10 in the rim portion R without an unwrinkling work in the inner circumferential edge 12 portion of the cladding layer 10. Moreover, since the conductive ink 52 forming the sensor 50 has stretch properties, it will follow the elongation and contraction of the sensor layer 30 (i.e. the substrate 40 and insulation sheet 45), thus, there will no fear of disconnection of the sensor 50 during the mounting work of the sensor layer 30. Furthermore, the configuration that the sensor 50 is composed of the conductive ink 52 is able to make the sensor layer 30 thinner when compared with an instance where the sensor is composed of a wire having a round sectional shape, and also reduce uncomfortable feeling caused by the presence of the sensor 50, thus improving the touch of the rim portion R.

Therefore, the steering wheel W in accordance with the exemplary embodiment has improved assembly easiness of the sensor layer 30 for detecting driver's grip with no fear of disconnection of the sensor 50. Moreover, it is able to make the sensor layer 30 thin, and has little uncomfortable feeling caused by the presence of the sensor 50, thus having good touch in the rim portion R.

In the steering wheel W in accordance with the exemplary embodiment, in an area between the substrate 40 and the insulation sheet 45 where the sensor 50 is disposed, the conductive ink 52 is arranged in a lattice pattern 54 in which a plurality of straight band-shaped lines 55, 56 intersect one another generally perpendicularly.

Even if the band-shaped lines 55, 56 break partially, the configuration that the sensor 50 is formed by applying the conductive ink 52 to the substrate 40 in the lattice pattern 54 in which the straight band-shaped lines 55, 56 intersect one another generally perpendicularly will keep the sensor 50 in a conducting state via other intersections 57 in the lattice pattern 54 in an entirety of the area where the sensor 50 is disposed. Accordingly, the steering wheel W with the above configuration has a good durability of the sensor 50, thus is able to provide steady grip-detecting performance. Further, the lattice pattern 54 by the conductive ink 52 means that the conductive ink 52 is not applied to the entirety of the area where the sensor 50 is disposed. The lattice pattern 54 provides an unapplied area 58 (FIG. 4) between the band-shaped lines 55, 56. This will save an amount of the conductive ink 52 to be applied to the substrate 40, and reduce a production cost of the sensor layer 30.

In the steering wheel W in accordance with the exemplary embodiment, moreover, the lattice pattern 54 of the conductive ink 52 is formed such that the bias direction BD of the lattice pattern 54 (i.e. a direction of a middle angle of an intersection angle of the band-shaped lines 55, 56) extends along a circumferential direction of the sensor layer 30 formed into an annular or ring shape.

With this configuration, when the sensor layer 30 is stretched for mounting on the cladding layer 10, the plurality of the band-shaped lines 55, 56 of the lattice pattern 54 stretch in the same direction and by the same length as one another, so that the sensor 50 (the conductive ink 52) will have a uniform density in the circumferential direction of the rim portion R. Therefore, this configuration will provide uniform sensitivity in grip-detection and steady grip-detecting performance in the area where the sensor 50 is disposed.

In the steering wheel W in accordance with the exemplary embodiment, a natural circumferential length CL1 of the sensor layer 30 (i.e. of the assembly 31) formed into an annular shape is substantially equal to the length (i.e. circumferential length) CL0 of the inner circumferential edge 12 of the cladding layer 10 in the rim portion R.

With this configuration, when the annular sensor layer 30 (i.e. the assembly 31) is stretched and put on the outer circumferential portion 11 of the cladding layer 10 in the rim portion R, as can be seen in FIGS. 6 and 7, both of the edges 31a in width direction of the band-shaped sensor layer 30 (assembly 31) are disposed in the inner circumferential edge 12 portion of the cladding layer 10 while a vicinity of a center 31a in the width direction of the sensor layer 30 is disposed in the outer circumferential portion 11 of the cladding layer 10 in the most elongated state. Influenced by this elongation, the both edges 31a in width direction of the band-shaped sensor layer 30 come close to one another in a shrinking fashion but without forming wrinkles or slacks, toward a top 12a ((A) in FIG. 7) of the inner circumferential edge 12 portion of the cladding layer 10. Accordingly, the above configuration will help fit vicinities of the both edges 31a in width direction of the sensor layer 30 on the inner circumferential edge 12 portion of the cladding layer 10 without causing wrinkles or the like, thus improving assembly easiness of the sensor layer 30 with respect to the front surface 10a of the cladding layer 10.

Figure 9:
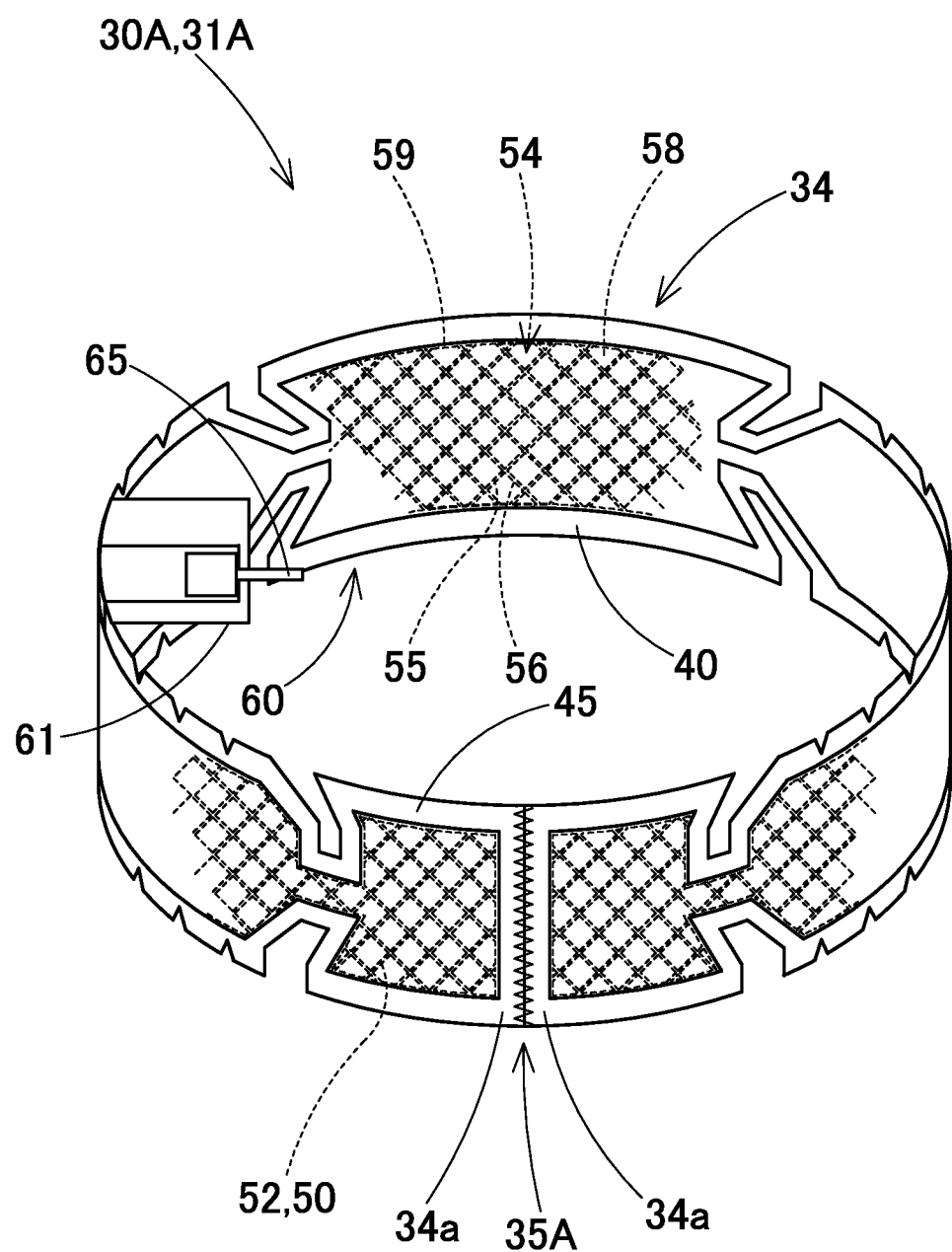
FIG. 9 is a schematic perspective view of a modification of the sensor layer.

Although the sensor layer 30 in the foregoing embodiment is composed of the assembly 31 that was formed by coupling two split band-shaped members 33L, 33R together, the sensor layer may alternatively be configured like a sensor layer 30A depicted in FIG. 9. The sensor layer 30A is composed of an assembly 31A that is formed into a ring by coupling opposite ends 34a of a single band-shaped member 34.

The illustrated embodiments have shown the steering wheel W with the rim portion R having a generally round annular shape for the illustrative purpose. However, the shape of the rim portion R should not be limited thereby. As long as it can be covered with a sensor layer having a generally annular shape, the rim portion R may be formed into various shapes such as a square annular shape and an oval annular shape.

The steering wheel in accordance with the exemplary embodiment includes: an annular rim portion for gripping for steering; a boss section that is disposed at a center of the rim portion; one or more spokes that interconnect the rim portion and the boss section; a core member that interconnect the rim portion, the boss section and the spokes, the core member including a wheel portion that is disposed in the rim portion; a cladding layer that is disposed around the wheel portion of the core member; a skin layer that is disposed on a front surface of the rim portion; and a sensor layer for detecting whether a driver is gripping the rim portion, the sensor layer being disposed between the cladding layer and the skin layer. The sensor layer includes: a sheet-shaped substrate that is disposed toward the cladding layer and has stretch properties; a sensor for detecting whether the driver is gripping the rim portion, the sensor being composed of a conductive ink having stretch properties that is applied to a grip area by the driver on a front surface of the substrate; and an insulation sheet that covers the sensor and is disposed toward the skin layer, the insulation sheet having stretch properties. The sensor layer is generally formed into an annular band and mounted on an outer circumferential portion of the cladding layer in the rim portion by being stretched and expanded.

With the steering wheel in accordance with the exemplary embodiment, when the annular sensor layer is mounted on the front surface of the cladding layer in the rim portion, the mounting is easily conducted by putting the sensor layer on the outer circumferential portion of the cladding layer while stretching and expanding the sensor layer. If then the sensor layer is adhered towards an inner circumferential portion of the cladding layer, or pressed onto the cladding layer with the use of the skin layer, the sensor layer is quickly disposed over the front surface of the cladding layer (over an entirety of the circumference of a section of the cladding layer) including the inner circumferential portion of the cladding layer. Since the sensor layer is composed of the substrate, the sensor composed of the conductive ink and the insulation sheet all of which have stretch properties, if a circumferential length of the sensor layer is so configured as not to cause wrinkles and slacks, the sensor layer is easily mounted on the front surface of the cladding layer in the rim portion without an unwrinkling work in the inner circumferential portion of the cladding layer. Moreover, since the conductive ink forming the sensor has stretch properties, it will follow the elongation and contraction of the sensor layer (i.e. the substrate and insulation sheet), thus, there will no fear of disconnection of the sensor during the mounting work of the sensor layer. Furthermore, the configuration that the sensor is composed of the conductive ink is able to make the sensor layer thinner when compared with an instance where the sensor is composed of a wire having a round sectional shape, and also reduce uncomfortable feeling caused by the presence of the sensor, thus improving the touch of the rim portion.

Therefore, the steering wheel in accordance with the exemplary embodiment has improved assembly easiness of the sensor layer for detecting the driver's grip with no fear of disconnection of the sensor. Moreover, it is able to make the sensor layer thin, and has little uncomfortable feeling caused by the presence of the sensor, thus has a good touch in the rim portion.

In one or more embodiments, the conductive ink may be arranged in a lattice pattern in which a plurality of straight band-shaped lines intersect one another generally perpendicularly in an area between the substrate and the insulation sheet where the sensor is disposed.

Even if the band-shaped lines break partially, the configuration that the sensor is formed by applying the conductive ink to the substrate in the lattice pattern in which the straight band-shaped lines intersect one another generally perpendicularly will keep the sensor in a conducting (energized) state via other intersections in the lattice pattern in an entirety of the area where the sensor is disposed. Accordingly, the steering wheel with the above configuration has a good durability of the sensor, thus is able to provide steady grip-detecting performance. Further, the lattice pattern by the conductive ink means that the conductive ink is not applied to the entirety of the area where the sensor is disposed. The lattice pattern provides an unapplied area between the band-shaped lines. This will save an amount of the conductive ink to be applied to the substrate, and reduce a production cost of the sensor layer.

In one or more embodiments, the lattice pattern of the conductive ink may be formed such that a bias direction thereof (i.e. a direction of a middle angle of an intersection angle of the band-shaped lines) extends along a circumferential direction of the sensor layer.

With this configuration, when the sensor layer is stretched for mounting on the cladding layer, the plurality of the band-shaped lines of the lattice pattern stretch in the same direction and by the same length as one another, so that the sensor (the conductive ink) will have a uniform density in the circumferential direction of the rim portion. Therefore, this configuration will provide uniform sensitivity in grip-detection and steady grip-detecting performance in the area where the sensor is disposed.

In one or more embodiments, a natural length of the sensor layer may be substantially equal to a length of an inner circumferential edge of the cladding layer in the rim portion.

With this configuration, when the annular sensor layer is stretched and put on the outer circumferential portion of the cladding layer in the rim portion, both of the edges in width direction of the band-shaped sensor layer will be disposed in the inner circumferential portion of the cladding layer while a vicinity of a center in the width direction of the sensor layer is disposed in the outer circumferential portion of the cladding layer, in the most elongated state. Influenced by this elongation, the both edges in width direction of the band-shaped sensor layer come close to one another in a shrinking fashion but without forming wrinkles or slacks, towards a top of the inner circumferential portion of the cladding layer. Accordingly, the above configuration will help fit vicinities of the both edges in width direction of the sensor layer on the inner circumferential portion of the cladding layer without causing wrinkles or the like, thus improving assembly easiness of the sensor layer with respect to the front surface of the cladding layer.

What is claimed is:

1. A steering wheel comprising:
an annular rim portion for gripping for steering;
a boss section that is disposed at a center of the rim portion;
one or more spokes that interconnect the rim portion and the boss section;
a core member that interconnects the rim portion, the boss section and the one or more spokes, the core member including a wheel portion that is disposed in the rim portion;
a cladding layer that is disposed around the wheel portion of the core member;
a skin layer that is disposed on a front surface of the rim portion; and
a sensor layer for detecting whether a driver is gripping the rim portion, the sensor layer being disposed between the cladding layer and the skin layer;
wherein the sensor layer includes:
a sheet-shaped substrate that is disposed toward the cladding layer and has stretch properties;
a sensor for detecting whether the driver is gripping the rim portion, the sensor being composed of a conductive ink having stretch properties that is applied to a grip area by the driver on a front surface of the substrate; and
an insulation sheet that covers the sensor and is disposed toward the skin layer, the insulation sheet having stretch properties; and
wherein
the sensor layer is prepared as a substantially band-shaped, annular assembly composed of a left and right pair of band-shaped members that are coupled to one another by ends thereof in a circumferential direction of the annular assembly,
the sensor layer is mounted on the rim portion so that the left and right pair of band-shaped members are disposed in a left portion and a right portion of the rim portion, respectively,
each of the left and right pair of band-shaped members includes the substrate, the sensor and the insulation sheet that are superimposed one above another,
the assembly is mounted on an outer circumferential portion of the cladding layer in the rim portion by being stretched and expanded,
a natural length of the sensor layer is substantially equal to a length of an inner circumferential edge of the cladding layer in the rim portion,
in an area between the substrate and the insulation sheet where the sensor is disposed, the conductive ink is arranged in a lattice pattern in which a plurality of straight band-shaped lines intersect one another substantially perpendicularly,
the lattice pattern of the conductive ink is formed such that a bias direction thereof extends along a circumferential direction of the sensor layer,
a dimension of a gap between the band-shaped lines of the lattice pattern one another is in a range from 1 to 9 mm, and
an occupancy of the conductive ink in the front surface of the substrate is in a range from 20 to 80%.

* * * * *